US008103538B2

(12) United States Patent
Bamberg et al.

(10) Patent No.: US 8,103,538 B2
(45) Date of Patent: Jan. 24, 2012

(54) METHOD AND SYSTEM FOR FORECASTING DEMAND OF A DISTRIBUTION CENTER AND RELATED STORES

(75) Inventors: Stephen Bamberg, Bartlett, IL (US); Joseph P. Tiemeyer, Highland Park, IL (US)

(73) Assignee: Walgreen Co., Deerfield, IL (US)

( * ) Notice: Subject to any disclaimer, the term of this patent is extended or adjusted under 35 U.S.C. 154(b) by 1715 days.

(21) Appl. No.: 10/300,228

(22) Filed: Nov. 20, 2002

(65) Prior Publication Data

US 2004/0098296 A1    May 20, 2004

(51) Int. Cl.
    *G06Q 10/00* (2012.01)
(52) U.S. Cl. .................................... 705/7.31
(58) Field of Classification Search ................. 705/7.31
    See application file for complete search history.

(56) References Cited

U.S. PATENT DOCUMENTS

| | | | | |
|---|---|---|---|---|
| 5,712,985 A * | 1/1998 | Lee et al. | ...................... | 705/7.31 |
| 5,884,037 A * | 3/1999 | Aras et al. | ...................... | 709/226 |
| 5,893,076 A * | 4/1999 | Hafner et al. | ...................... | 705/28 |
| 5,953,707 A * | 9/1999 | Huang et al. | ...................... | 705/7.25 |
| 5,960,414 A * | 9/1999 | Rand et al. | ...................... | 705/28 |
| 6,151,582 A * | 11/2000 | Huang et al. | ...................... | 705/7.25 |
| 6,298,348 B1 * | 10/2001 | Eldering | ...................... | 705/36 R |
| 6,609,101 B1 * | 8/2003 | Landvater | ...................... | 705/10 |
| 6,745,150 B1 * | 6/2004 | Breiman | ...................... | 702/181 |
| 6,834,266 B2 * | 12/2004 | Kumar et al. | ...................... | 705/7.29 |
| 6,910,017 B1 * | 6/2005 | Woo et al. | ...................... | 705/10 |
| 6,976,001 B1 * | 12/2005 | Levanoni et al. | ...................... | 705/10 |
| 7,092,929 B1 * | 8/2006 | Dvorak et al. | ...................... | 705/28 |
| 7,110,960 B2 * | 9/2006 | Phillips et al. | ...................... | 705/7.35 |
| 7,124,055 B2 * | 10/2006 | Breiman | ...................... | 702/181 |
| 7,165,037 B2 * | 1/2007 | Lazarus et al. | ...................... | 705/10 |
| 7,437,308 B2 * | 10/2008 | Kumar et al. | ...................... | 705/7.33 |
| 7,877,286 B1 * | 1/2011 | Neal et al. | ...................... | 705/7.31 |
| 2002/0069147 A1 * | 6/2002 | Sheehan et al. | ...................... | 705/35 |
| 2003/0074251 A1 * | 4/2003 | Kumar et al. | ...................... | 705/10 |
| 2003/0101087 A1 * | 5/2003 | Walker et al. | ...................... | 705/10 |
| 2003/0171990 A1 * | 9/2003 | Rao et al. | ...................... | 705/14 |
| 2004/0128202 A1 * | 7/2004 | Baum et al. | ...................... | 705/22 |
| 2004/0220771 A1 * | 11/2004 | Breiman | ...................... | 702/181 |
| 2005/0102272 A1 * | 5/2005 | Kumar et al. | ...................... | 707/2 |

OTHER PUBLICATIONS

Peter R. Winters, "Forecasting Sales by Exponentially Weighted Moving Averages", Management Science, vol. 6, No. 3 (Apr. 1960), pp. 324-342.*

Stevens, Mary Lynn; Deitch, Jonathan; "Targeting 'The Jones'", Apr. 1998, Credit Union Management, v21n4, pp. 22-24, Dialog 01616329.*

(Continued)

*Primary Examiner* — Jonathan G Sterrett

(74) *Attorney, Agent, or Firm* — Francis C. Kowalik; Marshall, Gerstein & Borun LLP; Randall G. Rueth

(57) ABSTRACT

A method and a system for forecasting demand of a distribution center and related stores are described herein. In particular, the system may identify a season and an item associated with the season. The system may generate initial forecasts of the item associated with the season for the plurality of stores. Based on the initial forecasts, the system may generate projected store sales. Accordingly, the system may generate projected store orders based on the projected store sales. Further, the system may generate an aggregate projected store order based on the projected store orders. Based on the aggregate projected store order, the system may generate a distribution center order of the item associated with the season.

22 Claims, 9 Drawing Sheets

OTHER PUBLICATIONS

Venugopal, V.; Baets, W.; "Neural networks and statistical techniques in marketing research: a conceptual comparison", 1994, Marketing Intelligence & Planning, 12, 7; ABI/INFORM Global, p. 30.*

Venugopal, V.; Baets, W.; "Neural networks and their Applications in Marketing Management", 1994, Journal of Systems Management, 45, 9 ABI/INFORM Global, p. 16.*

* cited by examiner

METHOD AND SYSTEM FOR FORECASTING DEMAND OF A DISTRIBUTION CENTER AND RELATED STORES

TECHNICAL FIELD

The present disclosure relates to retail and wholesale establishments and, more particularly to a method and system for forecasting demand of distribution center and related stores.

BACKGROUND

Seasonality, promotional events, and/or local events may affect demand of an item. For example, sales of sunscreen may peak during the summer and significantly dropped in the winter. On the other hand, cold/flu medicine may be in greater demand during winter than any other time of the year. Typically, a retail and/or wholesale establishment determines demand of a distribution center (DC) and related stores based on historical information such billings from the DC (i.e., output from the DC). That is, future billings of the related stores are based on past billings from the DC. For example, orders for a particular item may be made based on the number of units shipped out of the DC from last year. However, the historical billing may not provide an accurate assessment to forecast demand of the DC and related stores because the historical billing may include promotional demand. Further, the historical billing may be imprecise because a particular number of an item may have been shipped out previously but stores may not have sold every single unit of that item. In other words, stores may have a surplus of a particular item. For example, a store may be overstock with the item from a prior year, sale, and/or special.

To determine demand for a particular item simply at the store level may provide too small of a sample to accurately determine how many units of the item to order by the DC. Other factors such as current store inventory, multiple store orders, opening of new stores, closing of existing stores, and relocating of existing stores to more profitable locations may be also affect the DC order for the particular item. Therefore, a need exists for improving the effectiveness and efficiency of the process for forecasting demand of a distribution center and stores associated with the distribution center.

BRIEF DESCRIPTION OF THE DRAWINGS

This disclosure will describe several embodiments to illustrate its broad teachings. Reference is also made to the attached drawings.

DETAILED DESCRIPTION

A method and a system for forecasting demand of a distribution center and stores associated with the distribution center are described herein. The system includes a central computer operatively coupled to a distribution center and a plurality of market demand groups (MDGs). Each of the plurality of MDGs may include a plurality of stores sharing a common characteristic. That is, the plurality of stores may be classified as one of the plurality of MDGs based on, but not limited to, geographic location and demographic location. For example, one MDG may include stores near a beach whereas another MDG may include stores near a sporting event venue (e.g., football stadium). The computer may identify a season and an item associated with the season (i.e., a seasonal item). Based on the season and the seasonal item, the computer may generate initial forecasts of the seasonal item at the store level. That is, each store within an MDG may have an initial forecast of the seasonal item. Accordingly, the computer may generate projected store sales of the seasonal item based on the initial forecasts. Upon generating the projected store sales, the computer may generate projected store orders to meet the demand of the seasonal items at the stores. The projected store sales may be based on, but not limited to, promotional forecast, location forecast, and regular sales forecast. Further, the computer may aggregate the projected store orders to produce an aggregate projected store order at the MDG level. That is, the computer may combine the projected store orders from the stores associated with one of the plurality the MDGs to generate the aggregate projected store order for that particular MDG. Based on the aggregate projected store order, the computer may generate a distribution center order at the replenishment level so that the distribution center may order the seasonal item accordingly.

Figure 1:
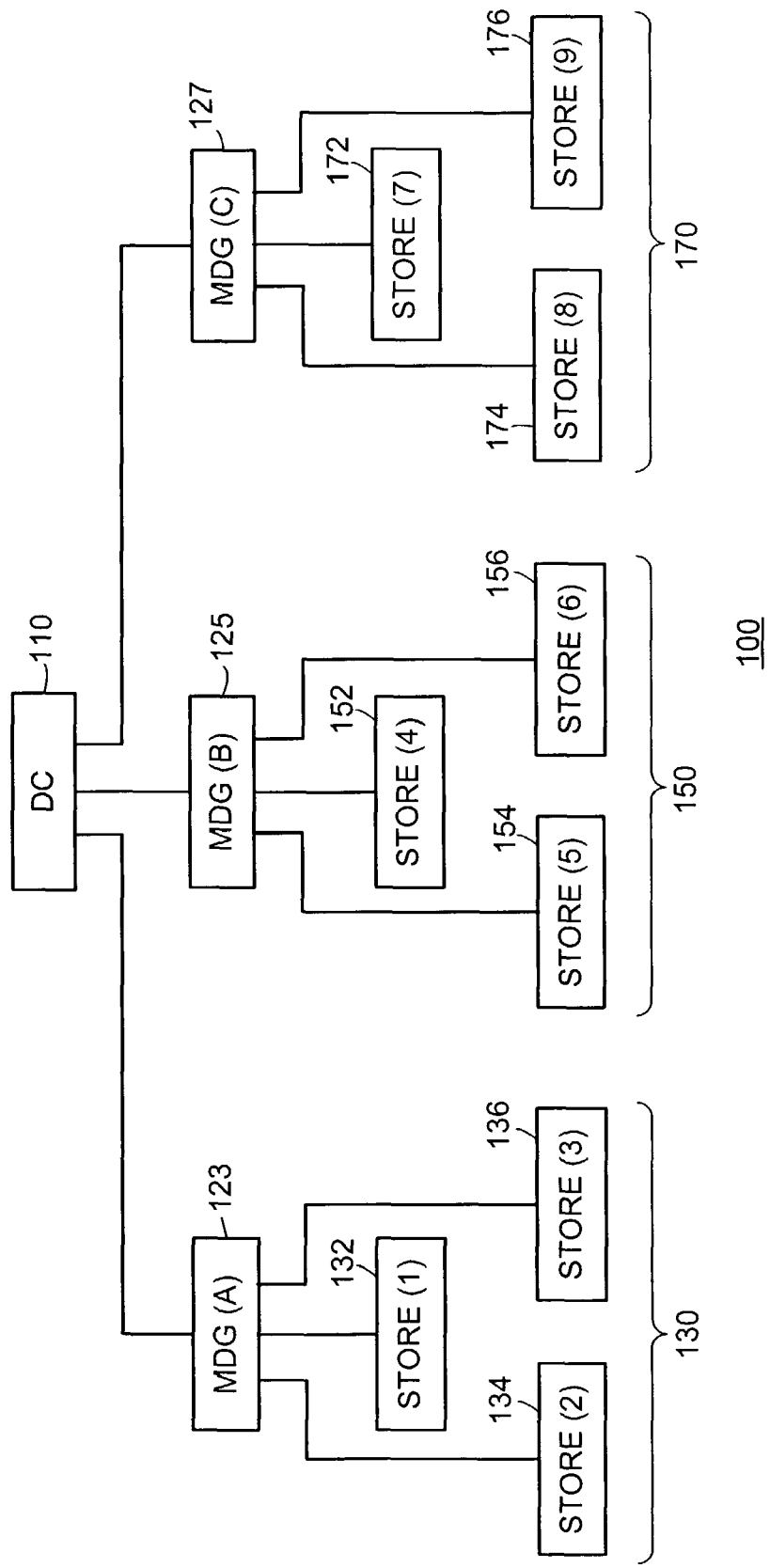
FIG. 1 is block diagram representation of a system for forecasting demand of a distribution center and stores associated with the distribution center.

Referring to FIG. 1, a system 100 for forecasting demand of an item includes a distribution center (DC) 110 and a plurality of market demand groups (MDG) 120, generally shown as 123, 125, and 127. Each of the plurality of MDGs 120 may include a plurality of stores, generally shown as 130, 150, and 170. For example, MDG (A) 123 may include STORE (1) 132, STORE (2) 134, and STORE (3) 136; MDG (B) 125 may include STORE (4) 152, STORE (5) 154, and STORE (3) 156; and MDG (C) 127 may include STORE (7) 172, STORE (8) 174, and STORE (9) 176. The plurality of MDGs 120 may be customized based on a variety of parameters and different categories such as, but not limited to, demographic and geographic location. For example, MDG (A) 123 may include stores in urban areas whereas MDG (B) 125 may include stores in rural areas. In another example, MDG (C) 127 may include stores near a beach or a sporting event venue (e.g., a football stadium and a basketball/hockey arena).

Figure 2:
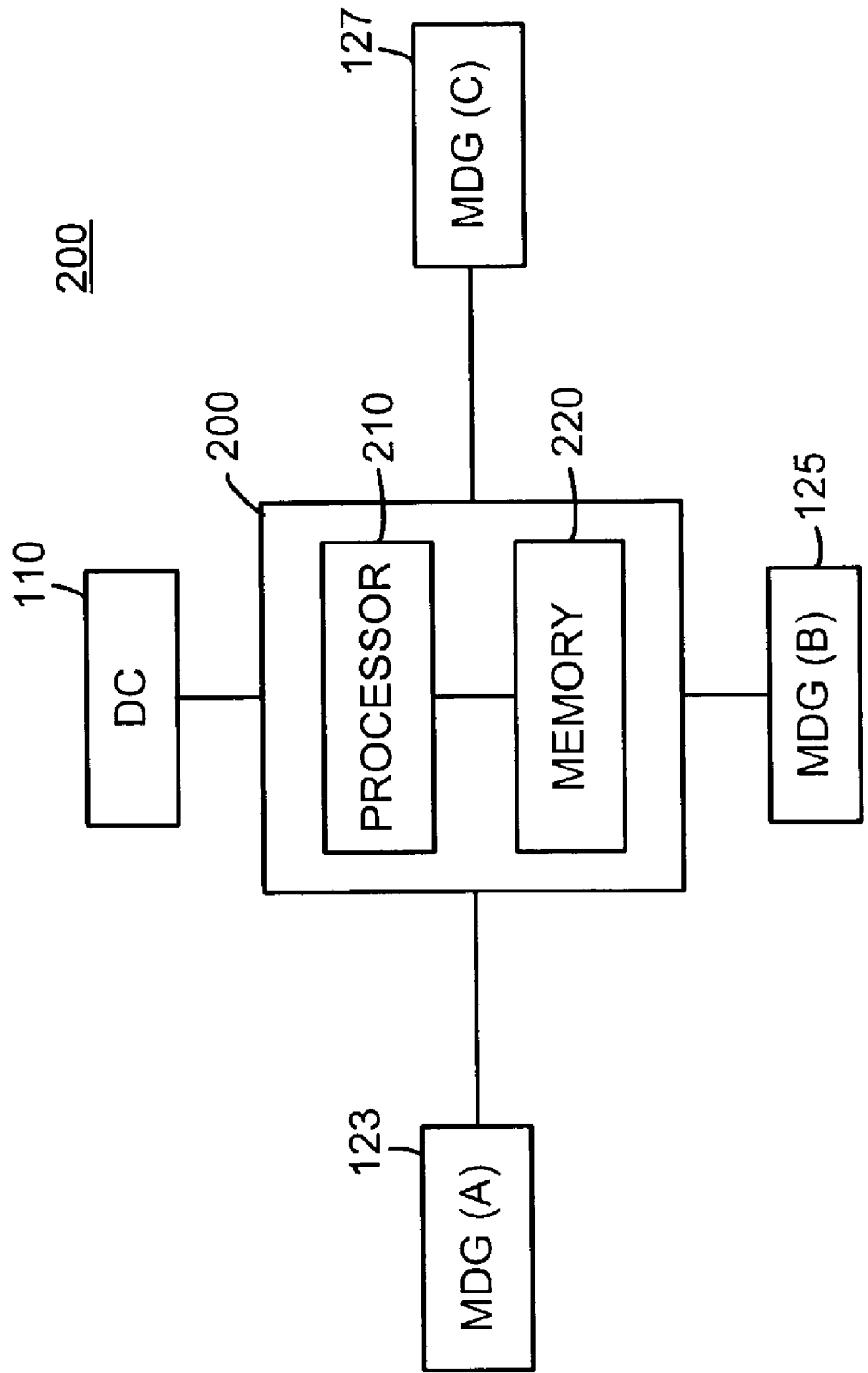
FIG. 2 is a block diagram representation of a central computer.

The DC 110 and the plurality of MDGs 120 may be operatively coupled to a central computer 200 as shown in FIG. 2. In particular, the central computer 200 includes a processor 210 and a memory 220. The processor 210 is operatively coupled to the memory 220, which stores a program or a set of operating instructions for the processor 220. The processor 220 executes the program or the set of operating instructions such that the computer 200 operates as described herein. The program of the set of operating instructions may be embodied in the memory 220, which may be a computer-readable medium such as, but not limited to, a hard disk, a floppy disk, a memory card, a memory stick, a compact disc, a digital versatile disc, a magnetic memory, a read only memory, an erasable programmable read only memory, a random access memory, a magnetic memory, and an optical memory. Alternatively, the computer 200 and the memory 220 may be configured as multiple components rather than a single (e.g., integral or unitary) component. For example, the memory 220 may be a separate database, which is operatively coupled to the processor 210 of the computer 200.

Figure 3:
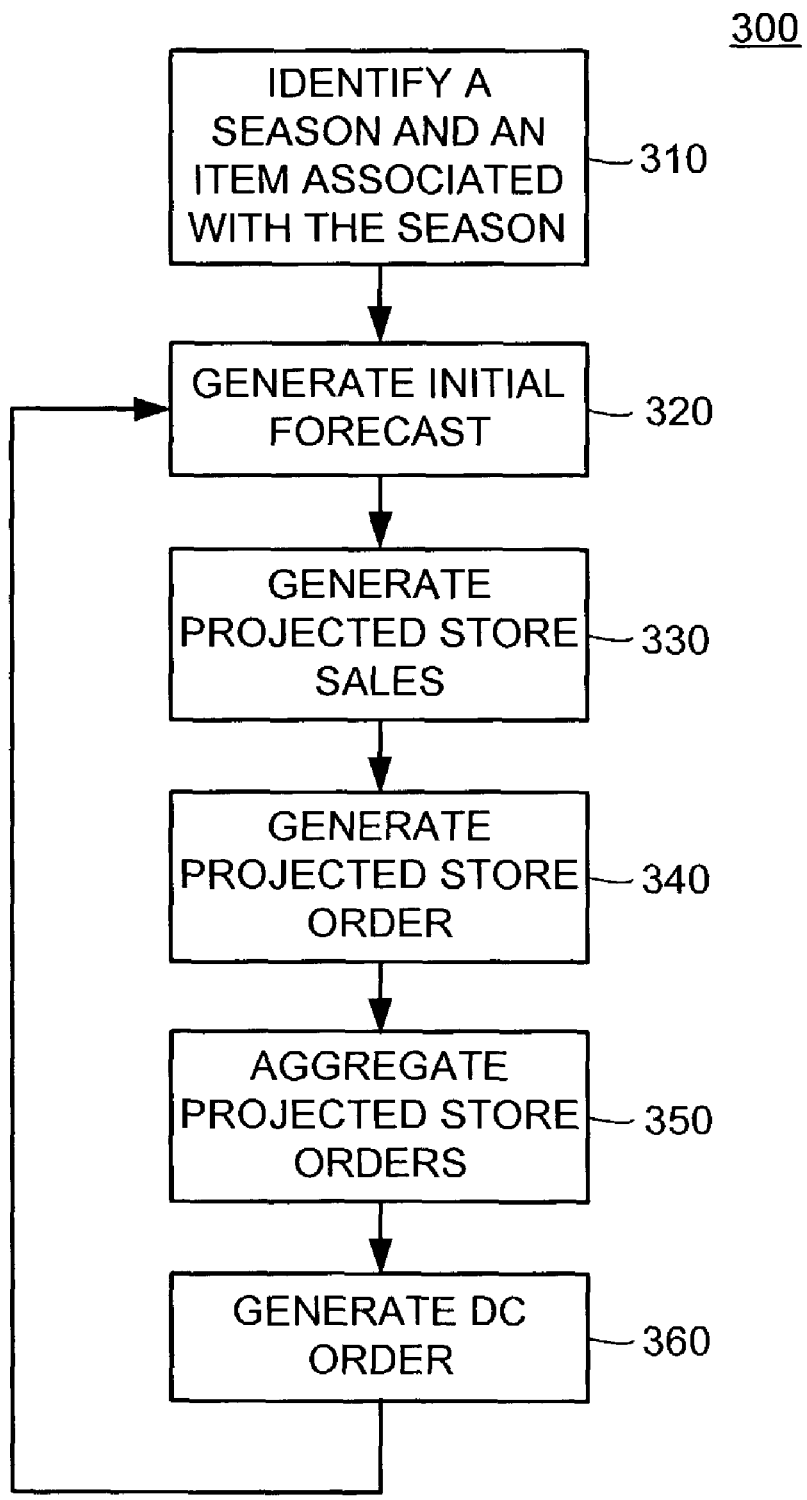
FIGS. 3, 4, 5, 6, 7, 8, and 9 are flow diagrams illustrating a method for forecasting demand of a distribution center and stores associated with the distribution center.

One possible implementation of the computer program executed by the computer 200 (e.g., via the processor 220) is illustrated in FIG. 3. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 3, persons of ordinary skill in the art will appreciate that these steps can be performed in other temporal sequences. Again, the flow chart 300 is merely provided as an example of one way to program the computer 200 to forecast demand of an item for the system 100 shown in FIG. 1. The flow chart 300 may begin at step 310 in which the computer 200 may identify a season and an item associated with the season (i.e., a seasonal item). The season may be associated with, but not limited to, a holiday (e.g., Halloween, Thanksgiving, Christmas, Hanukkah, New Year's Day) and a period of time of the year (e.g., fall, winter, spring, and summer). Based on consumer demand during a reoccurring season, order for the seasonal item may be better managed. The computer 200 at step 320 may generate initial forecasts of the seasonal item identified at step 310 for each store (i.e., at the store level) within a group (e.g., one of the plurality of MDGs 120). For example, the computer 200 may use several input data to generate an aggregate regular sales forecast, which in turn, is used to generate an indexed store sales forecast for week 1 and an allocated store sales forecast for weeks 1 through 52 as described in further detail below.

Based on the initial forecasts, the computer 200 at steps 330 and 340 may generate projected store sales and projected store orders, respectively, for each of the plurality of stores 130. The projected store sales may indicate the number of units of the seasonal item to meet consumer demand, and the projected store orders may indicate the number of units of the seasonal item needed to satisfy that demand. Next, at step 350, the computer 200 may aggregate the projected store orders to produce an aggregate projected store order. Here, the projected store sales and the projected store orders may be integrated together and then aggregated to the group level (i.e., for the plurality of MDGs 120). Accordingly, the computer 200 at step 360 may generate a DC order for the DC 110 (i.e., the replenishment level) based on the aggregate projected store order. Each of the steps mentioned above are described in detail below.

Although the embodiments disclosed herein are particularly well suited for use on a weekly basis, persons of ordinary skill in the art will readily appreciate that the teachings of this disclosure are in no way limited to such an interval of time. On the contrary, persons of ordinary skill in the art will readily appreciate that the teachings of this disclosure can be employed with other intervals of time such as, but not limited to, a daily basis, a biweekly basis, a monthly basis, a quarterly basis, a semi-annually basis, and an annually basis.

Figure 4:
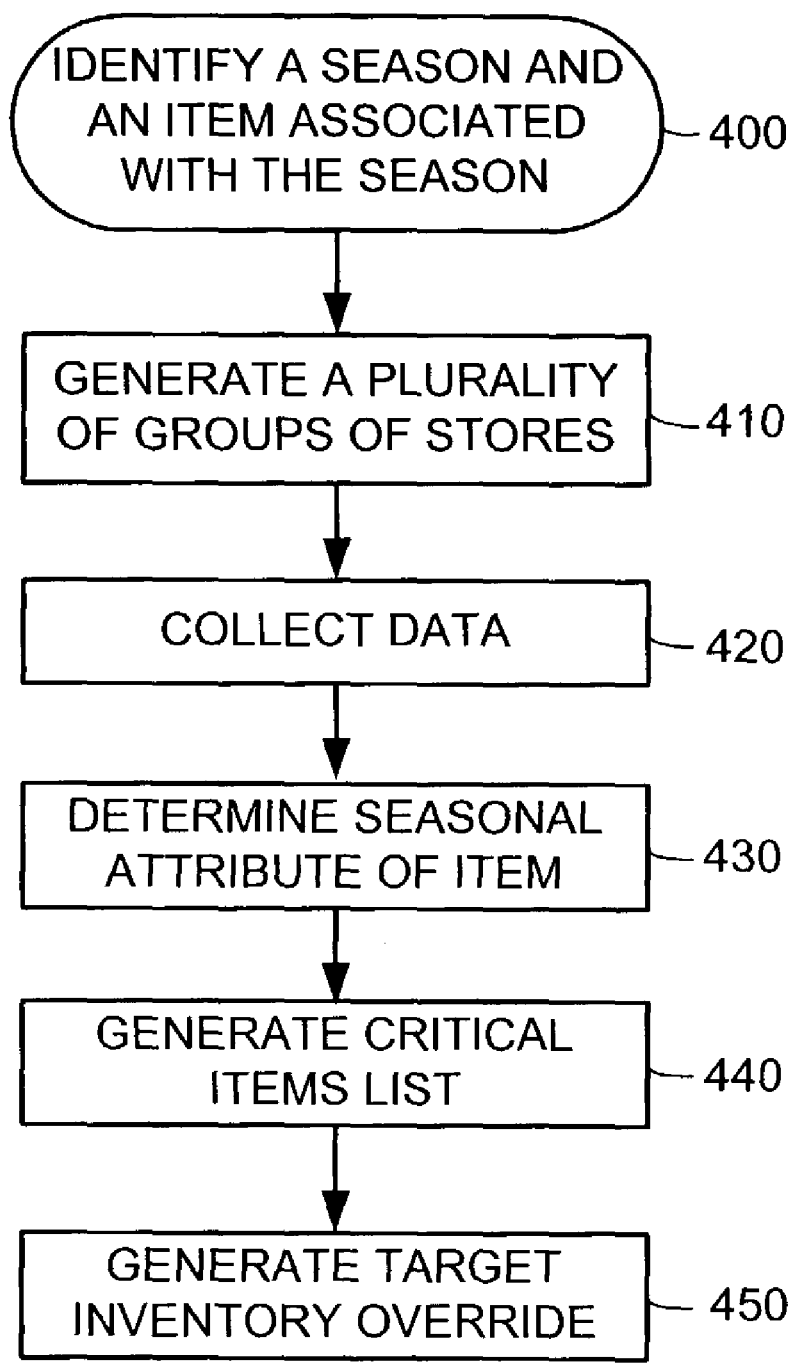

Identifying the season and the item associated with the season at step 310 involves identifying an item that demonstrate changes in consumer demand based on reoccurring seasons. For example, sales of sunscreen, beach chairs, and/or bottled water may peak during the summer whereas sales of flu and cough/cold medicine may significantly increase in the winter. During weekends in a football season, as another example, stores located near a football stadium may sell more beverages because of tailgaters than during the off-season. To illustrate this concept, a plurality of groups of stores (e.g., the plurality of MDGs 120) may be generated at step 410 shown in FIG. 4. That is, stores may be grouped together so that demand for a particular item may be determined. In particular, stores may be classified as a group based on, but not limited to, geographic and demographic locations. For example, MDG (A) 123 may include stores near a beach whereas MDG (B) 125 may include stores near a sporting event venue such as, but not limited to, a football stadium and a basketball/hockey arena. At step 420, the computer 200 may collect sales data associated with an item from each store within a group. Following the example above, the computer 200 may collect sales data for beach chairs from each store within the MDG (A) 123. Upon collecting sales data, the seasonal attribute of the item may be determined based on the sales data at step 430. In particular, the computer 200 may generate a seasonal score for the item based on information associated with an identified season such as, but not limited to, duration of the identified season, and sales of the item during the identified season. Based on its seasonal attribute, the item may be included in a list of critical seasonal items generated at step 440. For example, the computer 200 may compare the seasonal score for the item and a predetermined seasonality threshold. If the seasonal score for the item exceeds the predetermined seasonality threshold then the item may be added to the list of critical seasonal items. Accordingly, the computer 200 at step 450 may generate a target inventory for each item on the list of critical seasonal items. Here, the computer 200 may adjust the inventory for the seasonal items to meet consumer demand.

Figure 5:
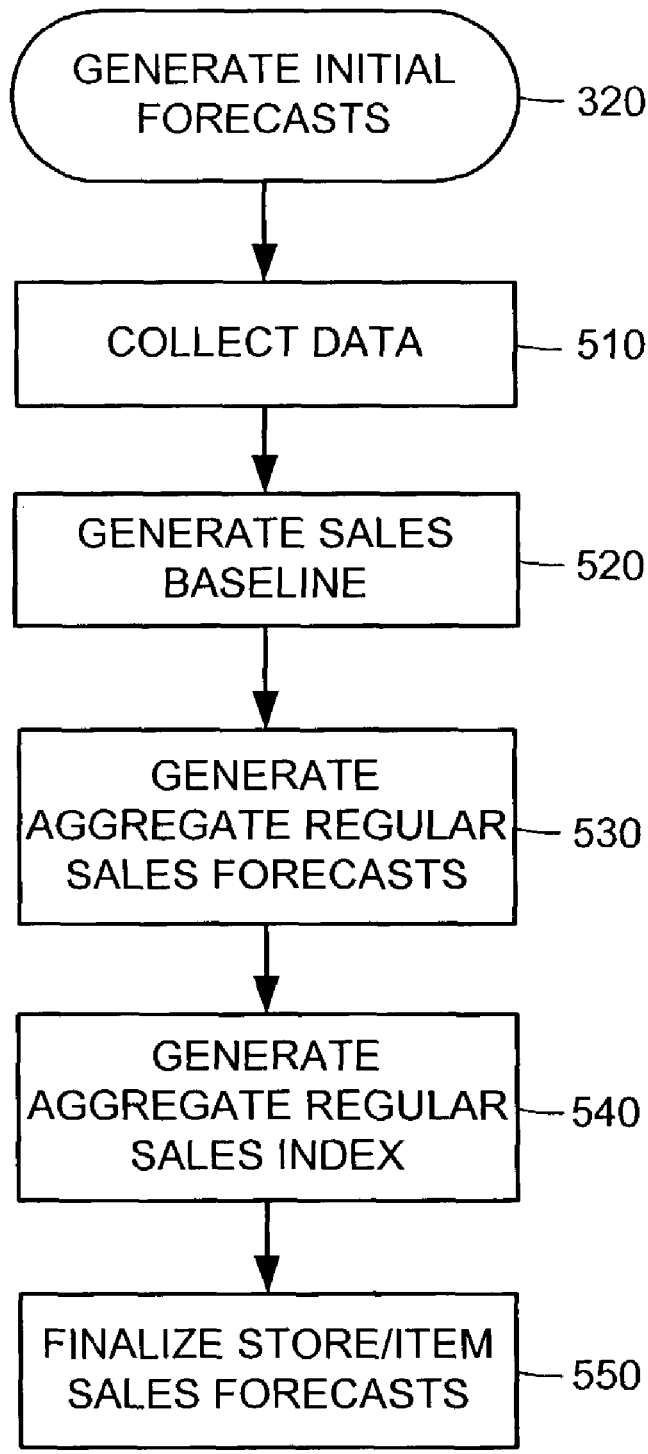

Referring to FIG. 5, a basic flow of generating initial forecasts at step 320 in FIG. 3 is shown. That is, an initial forecast of the seasonal item for each store within the group may be generated (i.e., for the store level). In particular, the computer 200 at step 510 may collect input data such as, but not limited, weekly sales and billings information of each store within the group. At step 520, the computer 200 may generate a sales baseline for each store within the group based on the input data. That is, the computer 200 may determine the average sales of each store without considering additional orders for promotional and/or local events. Based on the sales baseline for each store within the group, the computer 200 at step 530 may generate an aggregate regular sales forecast for the group as a whole during a forecast period. For example, the computer 200 may be collect input data of STORE (4) 152, STORE (5) 154, and STORE (6) 156 to generate a sales baseline for each of STORE (4) 152, STORE (5) 154, and STORE (6) 156, which in turn, are used to generate an aggregate regular sales forecast for the MDG (B) 125. The forecast period may be, but is not limited to, a predetermined number of weeks. For example, the computer 200 may generate an aggregate regular sales forecast for a 52-week period. Further, the computer 200 may adjust the aggregate regular sales forecast in response to, but not limited to, opening of a new store, closing of an existing store, relocation of an existing store, and shift of a store to a new MDG. Accordingly, the computer 200 at step 540 may generate an aggregate regular sales index representing an expected rate of change between the aggregate regular sales forecast during a particular interval within the forecast period and the actual sales during a preceding interval within the forecast period. For example, the aggregate regular sales index may represent the expected rate of change between the aggregate regular sales for week 1 (i.e., the particular interval) and the actual sales for week 0 (i.e., the preceding interval). Upon generating the aggregate regular sales index for the group as whole, the computer 200 at step 550 may generate a store regular sales forecast for each store within the group. That is, the store regular sales forecast may be allocated back down to the store level based on the aggregate regular sales index from the group level so each store within the group may have an initial sales forecast of the seasonal item. Following the above example, each of STORE (4) 152, STORE (5) 154, and STORE (6) 156 may have an initial sales forecast.

Figure 6:
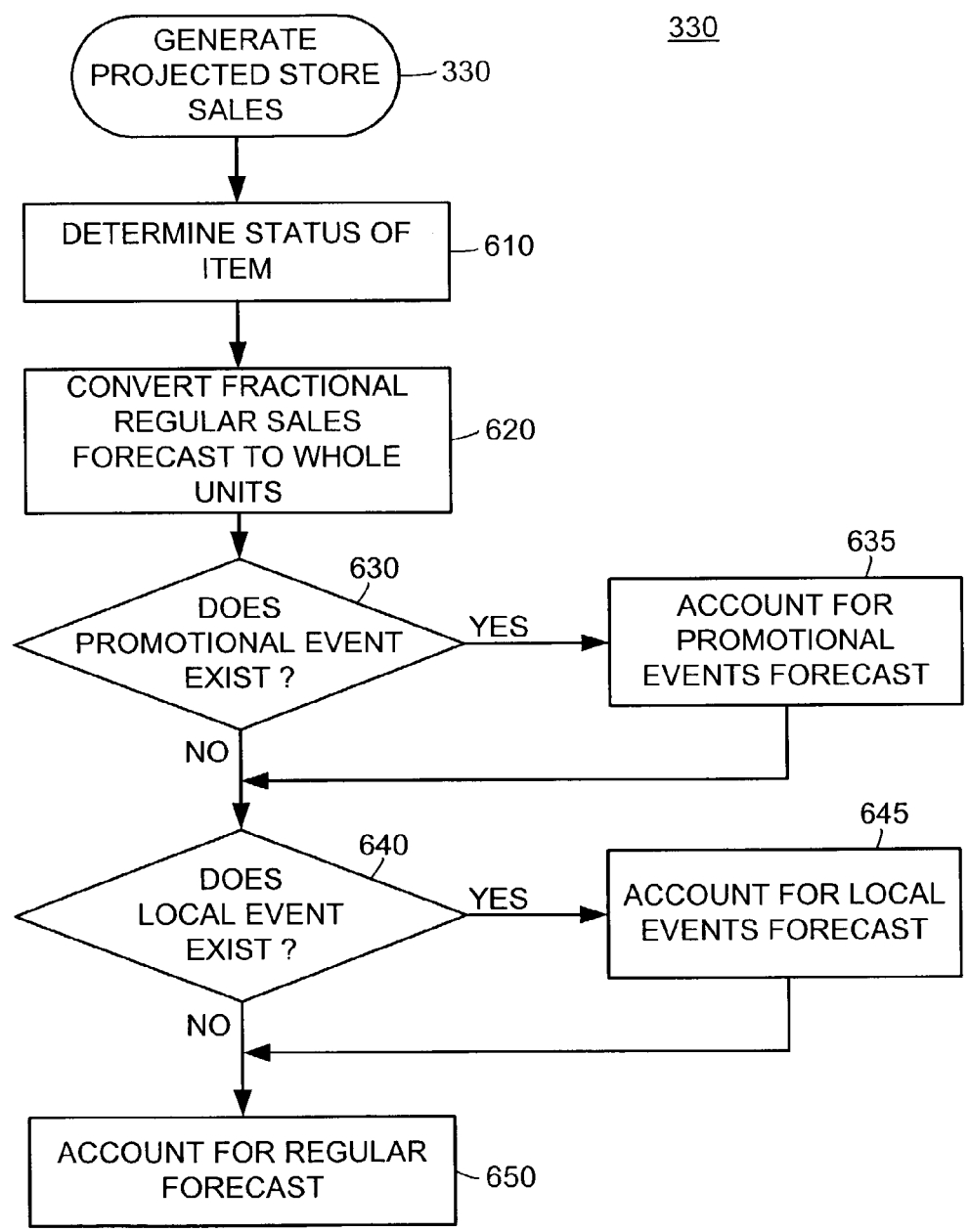

Based on the initial sales forecast as described above, the computer 200 may generate projected store sales of the seasonal item at the stores within the group as shown in FIG. 6. In particular, projected store sales may indicate how many unit(s) of the seasonal item that a store may sell. However, the projected store sales at each store may vary because the projected store sales may depend on, but not limited to, a promotional event forecast, a local event forecast, and a regular sales forecast. To determine the projected store sales at each store within the group, the computer 200 at step 610 may determine status of the seasonal item, which may be, re-orderable or discontinued. That is, the computer 200 may not determine the projected store sales of an item that is discontinued. Because a store cannot order a fraction of one unit (i.e., need to order a whole unit of the seasonal item), the computer 200 at step 620 may convert a fractional portion of the store regular sales forecast to a whole unit by rounding up or down. To illustrate this concept, a probability method may be used to determine whether to round up or to round down. If the store regular sales forecast as generated at step 550 in FIG. 5 is not a whole number, the computer 200 may generate a random number between zero (0) and one (1). If the store regular sales forecast is less than or equal to the fractional portion of the store regular sales forecast then the round the store regular sales forecast up to the nearest whole unit. Otherwise, round the store regular sales forecast down to the nearest whole unit (i.e., the random number is greater than the fractional portion of the store regular sales forecast). For example, the random number may be 0.4. If the store regular sales forecast is 0.6 units then round the store regular sales forecast up to 1 whole unit. If the store regular sales forecast is 3.3 then round the store regular sales forecast down to 3 whole units. At step 630, the computer 200 may determine whether there will be a promotional event such as, but not limited to, an annual sale and a weekend special. An example of a promotional event may be a sale on greeting cards each December. If so, the computer 200 at step 635 may account for the promotional event forecast and then proceed to step 640 as described in detail below. The promotional event forecast may indicate the quantity needed to satisfy the demand because of a promotional event. Otherwise, the computer 200 may proceed directly to step 640 to determine whether there is a local event such as, but not limited to, a sporting event (e.g., the Super Bowl). If there is a local event, the computer 200 at step 645 may account for the local event forecast and then proceed to step 650 as described below. The local event forecast may indicate the quantity needed to satisfy the demand because of a local event. However, if the computer 200 at step 640 determines that there is no local event then the computer 200 may proceed directly to step 650 to account for the regular sales forecast to generate the projected store sales of the seasonal item for each store.

Figure 7:
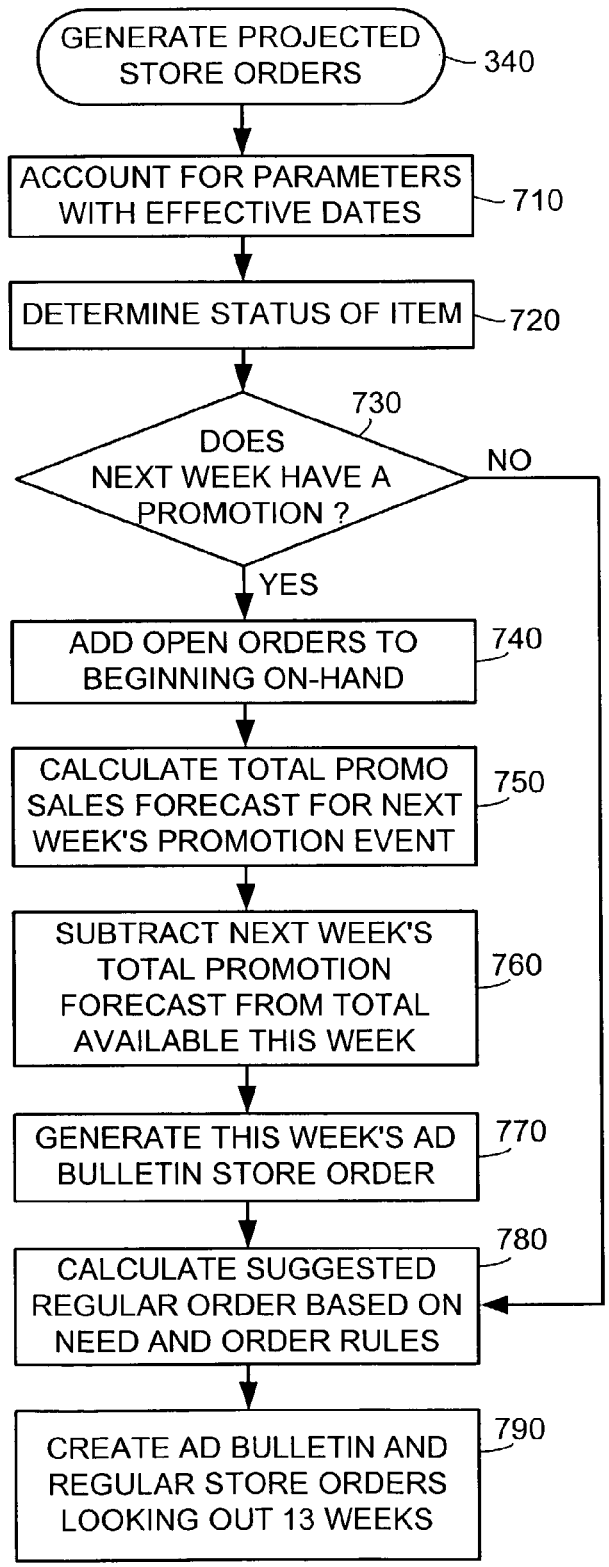

Based on the projected store sales of the stores, the computer 200 may generate projected store orders as shown in FIG. 7. In particular, the computer 200 at step 710 may account for parameters with upcoming effective dates to determine a projected store order for each store within the group. Parameters with upcoming effective dates may include, but not limited to, opening of new stores, multiple orders, and planogram (i.e., shelf appearance) resets and revisions. Some items may be ordered in bulk, i.e., ordered only in terms a package including a particular number of units. To avoid a surplus of the item by ordering separately for each store, the computer 200 may account for multiple orders (i.e., order from each store) by distribution. For example, STORE (1) 132 may need 20 units of sunscreen, STORE (2) 134 may also need 20 units, and STORE (3) 136 may only need 10 units but a package of sunscreen may include 50 units. Rather than ordering three (3) separate packages of sunscreen (i.e., 150 units of sunscreen), the computer 200 may account for the multiple orders by ordering only one package of sunscreen and distributing the 50 units within one package among the three stores. Further, the computer 200 may also account for the seasonal item being removed from the shelf (i.e., planogram). In which case, additional inventory may not be necessary. At step 720, the computer 200 may determine status of the item. That is, a projected store order as described in detail below may be projected for a re-orderable item whereas the computer 200 may not be able to do so for a discontinued item because the DC 110 no longer have inventory for that seasonal item. If the seasonal item is re-orderable, the computer 200 at step 730 may determine whether next week has a promotional event. If there is a promotional event next week, the computer 200 at step 740 may determine the total available quantity for the current week by adding open orders to the beginning on-hand quantity of an item. Open orders may indicate the quantity yet to be delivered to the store whereas the beginning on-hand quantity may indicate the quantity already in the store (e.g., inventory physically on the shelves). At step 750, the computer 200 may calculate total promotional sales forecast for next week's promotional event so that inventory may be ordered and be available before the promotional event. Based on the total available quantity for the current week and the total promotional sales forecast for next week, the computer 200 at step 760 may determine the additional inventory needed to ensure that the store may be fully supplied to cover the demand of the promotional event. That is, the computer 200 may subtract next week's total promotional sales forecast from the total available quantity for the current week to determine the quantity needed to meet the demand of the promotional event. At step 770, the computer 200 may generate a special store order (i.e., an ad bulletin),to satisfy the additional units needed to meet the demand during the promotional event. Because all of the units ordered for the promotional event may not be sold, the computer 200 at step 780 may determine a suggested regular store order based on need (i.e., the inventory on-hand at the store) so that the store inventory may return to the target inventory level after the promotional event. Upon generating the suggested regular store order, the computer 200 at step 790 may generate special store orders (i.e., ad bulletins) and regular store orders for an interval of the forecast period so that the store inventory may be brought down to the target inventory level. For example, the computer 200 may project out the special store orders and the regular store orders for 13 weeks to avoid a surplus of the seasonal item from outstanding on-orders (i.e., placed but undelivered orders). As noted above, the embodiments may be described in terms of weeks for illustrative purposes. Persons of ordinary skill in the art will appreciate that the teachings of this disclosure may operate in terms of other forecast periods.

Referring back to step 730, if there is no promotional event the next week then the computer 200 may proceed directly to step 780 as described above, and then proceed to step 790. Accordingly, the computer 200 may simply generate projected regular store orders of the seasonal item from the stores within the group.

Figure 8:
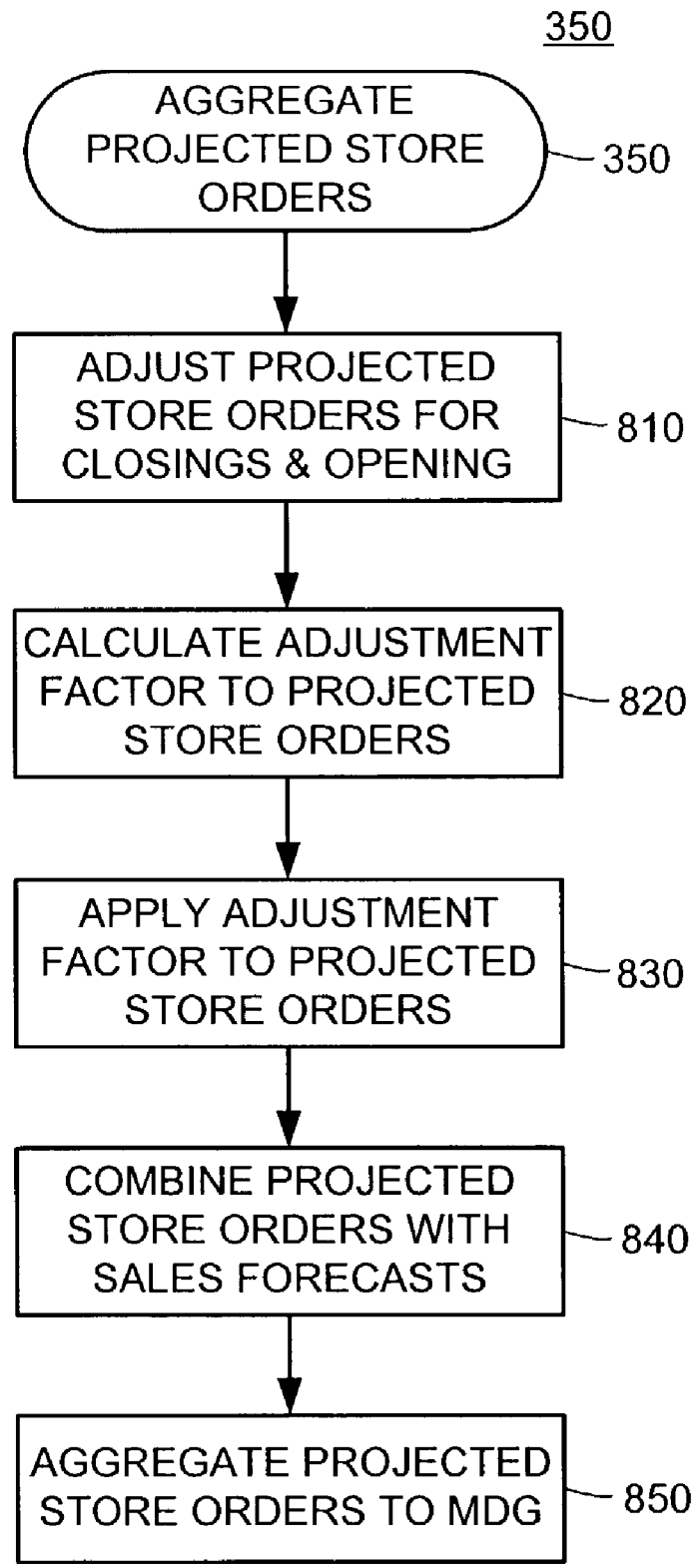

The regular projected store orders and the regular projected store sales of the stores within the group may be integrated together to generate an aggregate projected store order as shown in FIG. 8. That is, the projected store orders may be "rolled-up" from the store level to the group level (e.g., the MDG level). In particular, the projected store orders may be adjusted at step 810 as stores close and open. For example, the special and regular projected store orders for each store identified for closing may not be included in the aggregate projected store order for the MDG. In contrast, the special and regular projected store orders for existing stores and new stores may be incorporated into the aggregate projected store order for the MDG. At step 820, the computer 200 may determine an adjustment factor to account for lost inventory such as, but not limited to, damaged units and stolen units. Accordingly, the computer 200 at step 830 may apply the adjustment factor to the projected store orders to compensate for lost inventory. At step 840, the adjusted projected store orders from step 830 may be combined with regular projected store sales forecast to generate the final projected store orders. Based on the final projected store orders, the computer 200 at step 850 may generate the aggregate projected store order for the seasonal item to the group level (e.g., the MDG level). For example, the special and regular projected store orders for each store associated with MDG (B) 125 may be aggregated each week. Alternatively, the projected store orders may be aggregated to a custom seasonal store group level. For example, STORE (2) 134, STORE (5) 154, and STORE (8) 164 may be grouped together as a custom seasonal store group.

Figure 9:
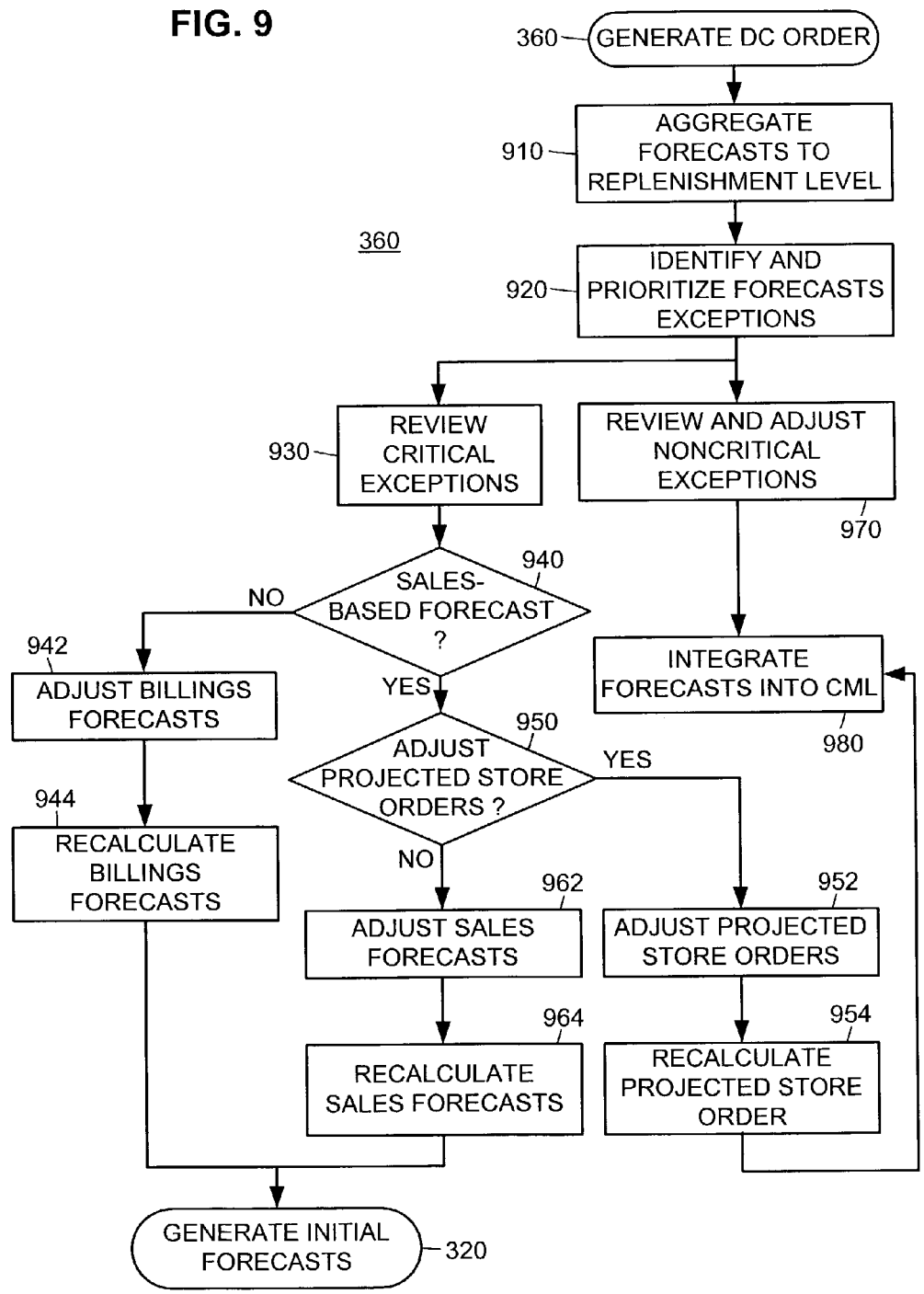

Referring back to FIG. 3, the computer 200 at step 360 may manage exceptions and generate a DC order. In particular, the computer 200 at step 910 in FIG. 9 may aggregate the forecasts (i.e., the regular projected store orders and the special projected store orders) from the group level to the replenishment level. At step 915, the computer 200 may generate the DC order for the DC 110. For example, the computer 200 may combine all the projected store orders from MDG (A) 123, MDG (B) 125, and MDG (C) 127 to generate the DC order for the DC 110, which in turn, may order the seasonal item accordingly.

At step 930, the computer 200 may determine critical exceptions (i.e., data anomalies caused by unusual factors and/or events). For example, projected store sales and projected store orders may be affected by a non-planned promotion because of, but not limited to, a hurricane. Accordingly, the computer 200 at step 940 may determine whether a forecast under is based on sales. If the forecast is based on sales, then the computer 200 may proceed to step 950 to determine whether to adjust the projected store orders (i.e., regular projected store orders and/or special projected store orders from the stores within the group). Otherwise, the computer 200 at step 960 may adjust the regular sales forecasts based on the critical exceptions. Accordingly, the computer 200 at step 970 may recalculate the regular sales forecasts for generating the initial forecasts at step 320.

Although the embodiments disclosed herein are particularly well suited to forecasting demand based on seasons, persons of ordinary skill in the art will readily appreciate that the teachings of this disclosure are in no way limited to such forecasts. On the contrary, persons of ordinary skill in the art will readily appreciate that the teachings of this disclosure can be employed with other trends.

Many changes and modifications to the embodiments described herein could be made. The scope of some changes is discussed above. The scope of others will become apparent from the appended claims.

What is claimed is:

1. A method for forecasting demand for an item from a distribution center and a plurality of stores associated with the distribution center using a central computer, the method comprising:

identifying, using at least one processor of the central computer, a season and an item associated with the season;

collecting, using the at least one processor, sales data of the item associated with the season from each store within the plurality of stores;

generating, for each store, using the at least one processor, a seasonal score for the item based on information associated with the identified season;

including, using the at least one processor, the item within a list of seasonal items in response to the seasonal score associated with the item being greater than a seasonal threshold;

monitoring, using the at least one processor, sales data of each of the plurality of stores associated with the distribution center;

generating, using the at least one processor, a sales baseline based on the sales data of each of the plurality of stores associated with the distribution center;

generating, using the at least one processor, an aggregate regular sales forecast for the plurality of stores based on the sales baseline, the season, and the item associated with the season;

generating, using the at least one processor, a store regular sales forecast for each store based on the aggregate regular sales forecast;

determining, using the at least one processor, a status of the item associated with the season;

generating, using the at least one processor, projected store sales for each store by, for each store:
converting, using the at least one processor, a fractional portion of the store regular sales forecast for the store to a whole unit in response to the item associated with the season having a re-orderable status;
accounting, using the at least one processor, for a promotional sales forecast in response to a promotional event during an interval of a period of time;
accounting, using the at least one processor, for a local event sales forecast in response to a local event; and
accounting, using the at least one processor, for the store regular sales forecast for the store;

accounting, using the at least one processor, for parameters with effective dates;

determining, using the at least one processor, for each store, in response to the promotional event during the interval of the period of time, a total available quantity of the item associated with the season by adding a number of open orders of the item associated with the season to an initial quantity of the item associated with the season that is available at the store;

generating, using the at least one processor, for each store, special store orders for the interval of the period of time based on the promotional sales forecast for the promotional event and the total available quantity of the item associated with the season;

generating, using the at least one processor, for each store, suggested regular store orders for the interval of the period of time based on inventory; and generating, using the at least one processor, for each store, projected store orders for the interval of the period of time, wherein each of the projected store orders for the interval of the period of time is based on the special store orders and the regular store orders;

generating, using the at least one processor, an aggregate projected store order for the plurality of stores based on the projected store orders for each store; and generating, using the at least one processor, a distribution center order of the item associated with the season based on the aggregate projected store order for the plurality of stores, the distribution center order being associated with the distribution center.

2. The method of claim 1, wherein the step of identifying a season and an item associated with the season comprises identifying an item associated with one of a holiday or a period of time of a year.

3. The method of claim 1, wherein the step of generating an aggregate projected store order for the plurality of stores based on the projected store orders for each store comprises:
adjusting the projected store orders in response to one of a closing of a store associated with the distribution center or an opening of a store associated with the distribution center;
determining an adjustment factor for the projected store orders to compensate for a number of lost units of the item;
adjusting the projected store orders based on the adjustment factor;
generating final projected store orders by combining the adjusted projected store orders with sales forecasts; and
aggregating the final projected store orders to a customized store group, the customized store group including stores selling the item associated with the season.

4. The method of claim 1, wherein the step of generating a distribution center order of the item associated with the season based on the aggregate projected store order for the plurality of stores comprises generating the distribution center order based on an aggregate projected store order from a customized store group including stores selling the item associated with the season.

5. In a system having a computer including a processor operating in accordance with a computer program embodied on a computer-readable medium for forecasting demand of a distribution center and a plurality of stores associated with the distribution center, the computer program comprising:
a first routine that directs the processor to:
identify a season and an item associated with the season;
collect sales data of the item associated with the season from each store within the plurality of stores;
generate a seasonal score, for each store, for the item based on information associated with the identified season; and
include the item within a list of seasonal items in response to the seasonal score associated with the item being greater than a seasonal threshold;
a second routine that directs the processor to:
collect sales data of each of the plurality of stores associated with the distribution center;
generate a sales baseline based on the sales data of each of the plurality of stores associated with the distribution center; and
generate an aggregate regular sales forecast for the plurality of stores based on the sales baseline, the season, and the item associated with the season; and
generate a store regular sales forecast for each store based on the aggregate regular sales forecast;
a third routine that directs the processor to:
account for a promotional sales forecast for each of the plurality of stores that is to have a promotional event during an interval of a period of time;
account for the store regular sales forecast for each store; and
generate projected store sales for each store based on the store regular sales forecast for each store and, for each store that is to have the promotional event during the interval of the period of time, further based on the promotional sales forecast for the store;
a fourth routine that directs the processor to:
determine, for each store that is to have the promotional event during the interval of the period of time, a total available quantity of the item associated with the season;
generate, for each store that is to have the promotional event during the interval of the period of time, special store orders for the interval of the period of time based on the promotional sales forecast for the promotional event and the total available quantity of the item associated with the season;
generate, for each store that is to have the promotional event during the interval of the period of time, suggested regular store orders for the interval of the period of time; and
generate projected store orders for each store for the interval of the period of time based on the projected store sales for each store and, for each store that is to have the promotional event during the interval of the period of time, further based on the special store orders for the store and the regular store orders for the store;
a fifth routine that directs the processor to:
adjust the projected store orders for each store in response to one of a closing of one of the plurality of stores associated with the distribution center or an opening of a new store associated with the distribution center;
determine an adjustment factor for the projected store orders for each store to compensate for a number of lost units of the item;
compensate for the number of lost units of the item by applying the determined adjustment factor to the projected store orders for each store;
combine the adjusted projected store orders for each store with sales forecasts to generate final projected store orders; and
generate an aggregate projected store order for the plurality of stores based on the final projected store orders for each store; and
a sixth routine that directs the processor to generate a distribution center order of the item associated with the season based on the aggregate projected store order for the plurality of stores, the distribution center order being associated with the distribution center.

6. The system of claim 5, wherein the first routine comprises a routine that directs the processor to identify an item associated with one of a holiday or a period of time of a year.

7. The system of claim 5, wherein the third routine comprises:
a routine that directs the processor to determine a status of the item associated with the season,
a routine that directs the processor to convert a fractional portion of the store regular sales forecast for each store to a whole unit in response to the item associated with the season having a re-orderable status, and
a routine that directs the processor to account for a local event forecast in response to a local event.

8. The system of claim 5, wherein the fourth routine comprises:
a routine that directs the processor to account for parameters with effective dates,
a routine that directs the processor to determine a status of the item associated with the season, a routine that directs the processor to determine, for each store that is to have the promotional event during the interval of the period of time, the total available quantity of the item associated with the season by adding a number of open orders of the item associated with the season to an initial quantity of the item associated with the season that is available at the store, and a routine that directs the processor to generate, for each store that is to have the promotional event during the interval of the period of time, the suggested regular store orders for the interval of the period of time based on inventory.

9. The system of claim 5, wherein the computer-readable medium is one of a hard disk, a floppy disk, a memory card, a memory stick, a compact disc, a digital versatile disc, a magnetic memory, a read only memory, an erasable programmable read only memory, a random access memory, a magnetic memory, or an optical memory.

10. A system for forecasting demand, the system comprising:
   a distribution center;
   a plurality of stores associated with the distribution center;
   a computer operatively coupled to the distribution center and the plurality of stores, the computer having a memory and a processor, the processor operatively coupled to the memory,
   the computer being programmed to identify a season and an item associated with the season,
   the computer being programmed to collect sales data of the item associated with the season from each store within the plurality of stores,
   the computer being programmed to generate a seasonal score, for each store, for the item based on information associated with the identified season,
   the computer being programmed to include the item within a list of seasonal items in response to the seasonal score associated with the item being greater than a seasonal threshold,
   the computer being programmed to collect sales data of each of the plurality of stores associated with the distribution center,
   the computer being programmed to generate a sales baseline based on the sales data of each of the plurality of stores associated with the distribution center,
   the computer being programmed to generate an aggregate regular sales forecast for the plurality of stores based on the sales baseline, the season, and the item associated with the season,
   the computer being programmed to generate an aggregate regular sales index for the plurality of stores based on the aggregate regular sales forecast in response to at least one of: (i) an opening of a new store associated with the distribution center; (ii) a closing of one of the plurality of stores associated with the distribution center; or (iii) a relocation of one of the plurality of stores associated with the distribution center, the aggregate regular sales index representing an expected rate of change between aggregate regular sales for the plurality of stores during a particular interval of a period of time and actual sales for the plurality of stores during an interval of the period of time preceding the particular interval of the period of time,
   the computer being programmed to generate a store regular sales forecast for each store based on the aggregate regular sales index,
   the computer being programmed to generate projected store sales for each store based on the store regular sales forecast for each store,
   the computer being programmed to generate projected store orders for each store based on the projected store sales for each store,
   the computer being programmed to generate an aggregate projected store order for the plurality of stores based on the projected store orders for each store, and
   the computer being programmed to generate a distribution center order of the item associated with the season based on the aggregate projected store order for the plurality of stores, the distribution center order being associated with the distribution center.

11. The system of claim 10, wherein the computer is programmed to identify an item associated with one of a holiday or a period of time of a year.

12. The system of claim 10, wherein the computer is programmed to determine a status of the item associated with the season,
   the computer is programmed to convert fractional regular sales forecast to whole units in response to the item associated with the season having a re-orderable status,
   the computer is programmed to account for promotional event forecast in response to a promotional event,
   the computer is programmed to account for local event forecast in response to a local event, and
   the computer is programmed to account for regular sales forecast.

13. The system of claim 10, wherein the computer is programmed to account for parameters with effective dates,
   the computer is programmed to determine a status of the item associated with the season,
   the computer is programmed to determine, for each store, in response to a promotional event during an interval of the period of time, a total available quantity of the item associated with the season by adding a number of open orders of the item associated with the season to an initial quantity of the item associated with the season that is available at the store,
   the computer is programmed to determine, for each store, a total promotional sales forecast for the promotional event,
   the computer is programmed to generate, for each store, special store orders for the interval of the period of time based on the total promotional sales forecast and the total available quantity of the item associated with the season,
   the computer is programmed to generate, for each store, suggested regular store orders for the interval of the period of time based on inventory, and
   the computer is programmed to generate, for each store, projected store orders for the interval of the period of time, wherein each of the projected store orders for the interval of the period of time is based on the special store orders and the regular store orders.

14. The computer of claim 10, wherein the processor is programmed to adjust the projected store orders in response to one of a closing of a store associated with the distribution center or an opening of a store associated with the distribution center,
   the processor is programmed to determine an adjustment factor for the projected store orders to compensate for a number of lost units of the item,
   the processor is programmed to adjust the project store orders based on the adjustment factor, the processor is programmed to combine the adjusted projected store orders with sales forecasts to generate final projected store orders, the processor is programmed to aggregate the final projected store orders to a customized store group, the customized store group including the plurality of stores.

15. The computer of claim 10, wherein the memory comprises one of a hard disk, a floppy disk, a memory card, a memory stick, a compact disc, a digital versatile disc, a magnetic memory, a read only memory, an erasable programmable read only memory, a random access memory, a magnetic memory, or an optical memory.

16. A method for forecasting demand of an item from a distribution center and a plurality of stores associated with the distribution center using a central computer, the method comprising:

selecting, using at least one processor of the central computer, a period of time and an item associated with the period of time;

generating, using the at least one processor, a seasonal score for the item based on information associated with the selected period of time;

generating an initial forecast for the plurality of stores based on the selected period of time and the item associated therewith;

generating, using the at least one processor, regular sales forecasts at a store level based on the initial forecast for the plurality of stores;

accounting, using the at least one processor, for a promotional sales forecast for each of the plurality of stores that is to have a promotional event during an interval of time;

accounting, using the at least one processor, for the regular sales forecasts at the store level;

generating, using the at least one processor, projected sales at the store level based on the regular sales forecasts at the store level and, for each store that is to have the promotional event during the interval of time, further based on the promotional sales forecast for the store;

determining, using the at least one processor, for each store that is to have the promotional event during the interval of time, a total available quantity of the item associated with the selected period of time;

generating, using the at least one processor, for each store that is to have the promotional event during the interval of time, special store orders for the interval of time based on the promotional sales forecast for the promotional event and the total available quantity of the item associated with the selected period of time;

generating, using the at least one processor, for each store that is to have the promotional event during the interval of time, suggested regular store orders for the interval of time;

generating, using the at least one processor, order forecasts at the store level for the interval of time based on the projected sales at the store level and, for each store that is to have the promotional event during the interval of time, further based on the special store orders for the store and the regular store orders for the store;

adjusting the order forecasts in response to one of a closing of one of the plurality of stores associated with the distribution center or an opening of a new store associated with the distribution center;

determining an adjustment factor for the order forecasts to compensate for a number of lost units of the item;

compensating for the number of lost units of the item by applying the determined adjustment factor to the order forecasts;

generating final order forecasts by combining the adjusted order forecasts with sales forecasts;

generating an aggregate order forecast for the plurality of stores based on the final order forecasts at the store level; and generating, using the at least one processor, a replenishment order of the item at a replenishment level based on the aggregate order forecast for the plurality of stores.

17. The method of claim 1, further comprising: comparing the seasonal score for the item and the seasonal threshold.

18. The system of claim 5, wherein the computer program further comprises a seventh routine that directs the processor to compare the seasonal score for the item and the seasonal threshold.

19. The system of claim 10, wherein the computer is programmed to compare the seasonal score for the item and the seasonal threshold.

20. The method of claim 1, further comprising adjusting the aggregate regular sales forecast for the plurality of stores by generating, using the at least one processor, an aggregate regular sales index for the plurality of stores in response to at least one of: (i) an opening of a store associated with the distribution center; (ii) a closing of a store associated with the distribution center; or (iii) a relocation of a store associated with the distribution center, wherein the aggregate regular sales index represents an expected rate of change between aggregate regular sales for the plurality of stores during a particular interval of a period of time and actual sales for the plurality of stores during an interval of the period of time preceding the particular interval of the period of time, and wherein generating the store regular sales forecast for each store is further based on the aggregate regular sales index for the plurality of stores.

21. The system of claim 5, wherein the first routine comprises a routine that directs the processor to generate the seasonal score for each store for the item based on a duration of the season and a number of sales of the item during the season.

22. The system of claim 5, wherein the second routine further directs the processor to adjust the aggregate regular sales forecast for the plurality of stores by generating an aggregate regular sales index for the plurality of stores in response to at least one of: (i) an opening of a new store associated with the distribution center; (ii) a closing of one of the plurality of stores associated with the distribution center; or (iii) a relocation of one of the plurality of stores associated with the distribution center, wherein the aggregate regular sales index represents an expected rate of change between aggregate regular sales for the plurality of stores during a particular interval of a period of time and actual sales for the plurality of stores during an interval of the period of time preceding the particular interval of the period of time, and wherein the second routine directs the processor to generate the store regular sales forecast for each store based on the aggregate regular sales forecast by directing the processor to generate the store regular sales forecast for each store based on the aggregate regular sales forecast and further based on the aggregate regular sales index.

* * * * *